United States Patent [19]

Viramontes

[11] Patent Number: 4,873,788
[45] Date of Patent: Oct. 17, 1989

[54] BRACKET ASSEMBLY AND PLANT LEAF LIFTER AND PROTECTOR

[76] Inventor: Jose A. Viramontes, Star Rte., Box 18-A, Mesilla Park, N. Mex. 88047

[21] Appl. No.: 211,040

[22] Filed: Jun. 24, 1988

[51] Int. Cl.$^4$ ............................................. A01G 25/00
[52] U.S. Cl. .................................... 47/1.7; 239/288.5; 403/385
[58] Field of Search ............... 47/1.7, 1.5; 239/288, 239/288.3, 288.5, 172, 173; 403/385, 400

[56] References Cited

U.S. PATENT DOCUMENTS

| | | | |
|---|---|---|---|
| 2,663,973 | 12/1953 | White | 239/288 |
| 2,873,149 | 2/1959 | Redetzke | 403/385 |
| 3,157,415 | 11/1964 | Martin | 403/385 |
| 3,202,359 | 8/1965 | Gill | 239/172 |
| 3,683,547 | 8/1972 | Harden | 47/1.7 |
| 3,756,327 | 9/1973 | Orthman | 403/385 |
| 3,902,817 | 9/1975 | Meir | 403/385 |
| 4,521,988 | 6/1985 | Thacker | 47/1.7 |
| 4,786,204 | 11/1988 | Mayeda | 403/385 |

FOREIGN PATENT DOCUMENTS

| | | | |
|---|---|---|---|
| 216740 | 8/1961 | Austria | 403/385 |
| 1566395 | 5/1969 | France | 239/288 |

*Primary Examiner*—Henry E. Raduazo
*Attorney, Agent, or Firm*—Fleit, Jacobson, Cohn, Price, Holman & Stern

[57] ABSTRACT

A bracket assembly for mounting on any size tool bar or similar supporting structure oriented transversely at the rear of a tractor and supporting an agricultural implement such as a spray rig assembly which includes a plant leaf lifter and protector supported in depending, trailing relation to the bracket assembly by a pair of pivotal, parallel links having a ground engaging supporting shoe or skid at the lower end which supports a plant leaf lifter and protector associated with spray nozzles so that liquid discharged from the nozzles will not directly engage the plant stems or foliage. The bracket assembly includes a variation that enables the tool bar to be supported from the draft mechanism of the tractor including a structure accommodating the draft pins on the lower links or arms of a three point hitch mounted on the tractor. The plant leaf lifter and protector includes a semi-rigid shield and support structure enabling the position of the shield to be adjusted and the shape and thus the leaf lifting characteristics of the shield to be varied.

15 Claims, 4 Drawing Sheets

BRACKET ASSEMBLY AND PLANT LEAF LIFTER AND PROTECTOR

BACKGROUND OF THE INVENTION

Field of the Invention

A bracket assembly for mounting on any size tool bar or similar supporting structure oriented transversely at the rear of a tractor and supporting an agricultural implement such as a spray rig assembly which includes a plant leaf lifter and protector supported in depending, trailing relation to the bracket assembly by a pair of pivotal, parallel links having a ground engaging supporting shoe or skid at the lower end thereof as well as a unique plant lifter and protector associated with spray nozzles so that liquid discharged from the nozzles will not directly engage the plant stems or foliage. The bracket assembly includes a variation that enables the tool bar to be supported from the draft mechanism of the tractor including a structure accommodating the draft pins on the lower links or arms of a three point hitch mounted on the tractor.

Information Disclosure Statement

In present agricultural procedures, an elongated tool bar is supported transversely at the rear of a tractor and various implements are attached thereto. Such implements include cultivators, various tillage implements, spray rigs for discharging herbicides, fertilizers and the like and various other implements. Likewise, the tool bar or the supporting structure is provided with a structure which enables it to be detachably supported from the draft arrangement of the farm tractor such as a three point hitch assembly on the tractor. While various arrangements have been provided to facilitate efficient mounting of various implements, previously known devices do not employ the unique bracket assembly of the present invention including its variations nor do the prior patents disclose the unique plant lifter and protector supported from the bracket assemblies mounted on the tool bar.

SUMMARY OF THE INVENTION

An object of the present invention is to provide a bracket assembly and a plant leaf lifter and protector with the bracket assembly providing a unique structure and support for a spray rig including a plant leaf lifter and protector and a modified version of the bracket assembly providing effective connection of a tool bar with the lower arms of a three point hitch assembly on a tractor.

Another object of the invention is to provide an assembly in accordance with the preceding object in which the bracket can be attached to any standard size tool bar oriented in any position about its longitudinal axis for extending forwardly from the tool bar and constructed to accommodate the draft pins on the lower arms of a three point hitch on a farm tractor with a slightly modified version of the bracket assembly mounted on the tool bar for supporting a depending implement including a spray rig assembly and a plant leaf lifter and protector.

A further object of the invention is to provide an assembly in accordance with the preceding objects in which the plant leaf lifter and protector is supported by parallel pivotal links connected to the bracket assembly at their upper ends and connected to a skid or shoe at the lower end thereof together with structure which supports an elongated plastic panel shaped and formed in a particular manner to form a protective shield and to lift and guide plant leaves and foliage therebetween with the spray rig nozzles being disposed outboard of the protective shields for discharging liquid from the nozzles onto the ground surface adjacent the plants without direct contact with the plant stems or foliage.

Still another object of the invention is to provide a bracket assembly and plant lifter and protector which is easily and quickly mounted on a tool bar in laterally adjusted position and which provides an adjustable limit of downward movement for the plant leaf lifter and protector to enable the entire assembly to be elevated along with the tool bar when the three point hitch of the tractor is actuated to elevate the tool bar with the bracket assembly being adapted to various versions and uses and being rugged in construction and effective and long-lasting in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
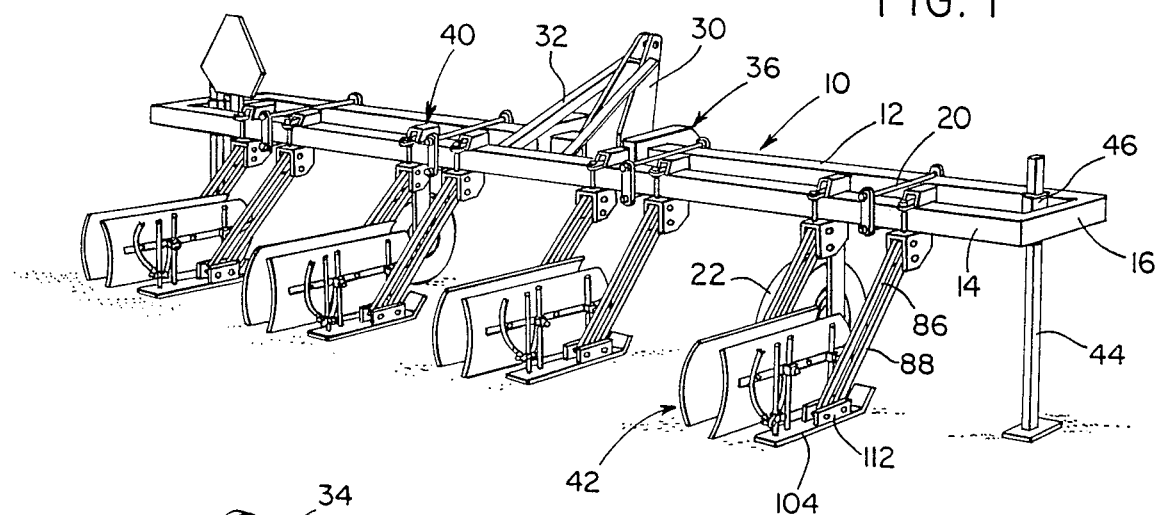
FIG. 1 is a rear perspective view of a tool bar assembly illustrating the bracket assemblies and plant leaf lifters and protectors of the present invention incorporated therein.
Figure 2:
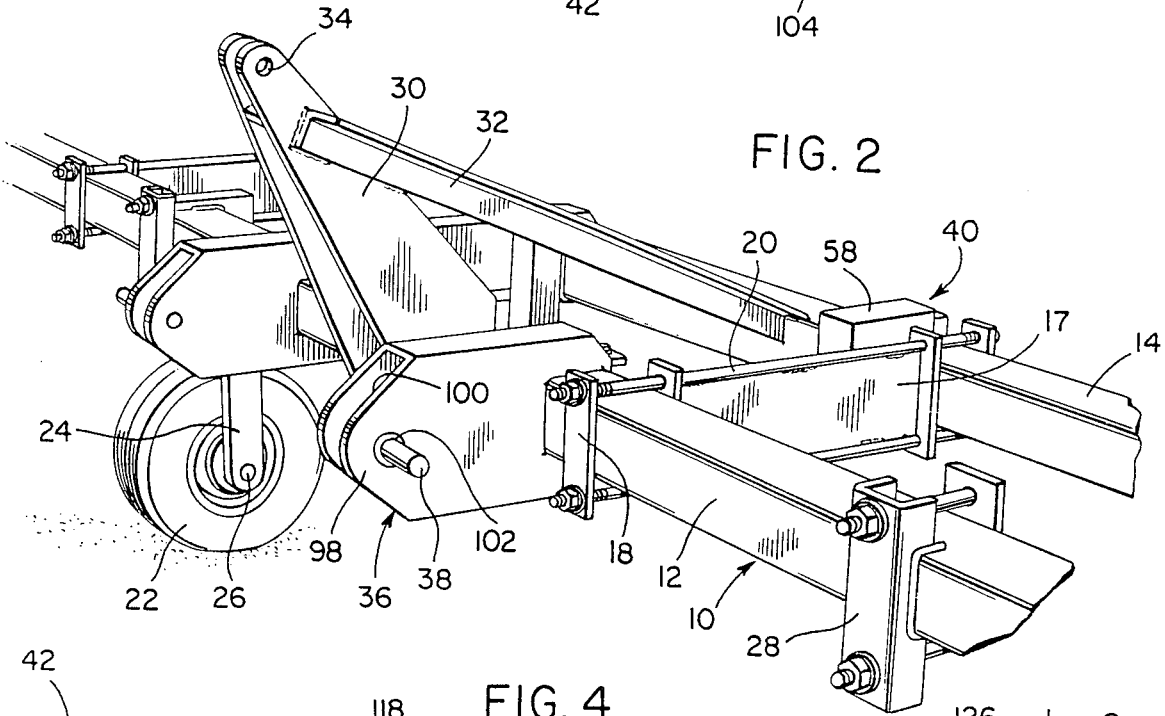
FIG. 2 is an enlarged perspective view of a portion of the front of the tool bar assembly illustrating modified versions of the bracket assembly constructed to accommodate the draft pins on the lower arms of a three point hitch of a farm tractor.
Figure 4:
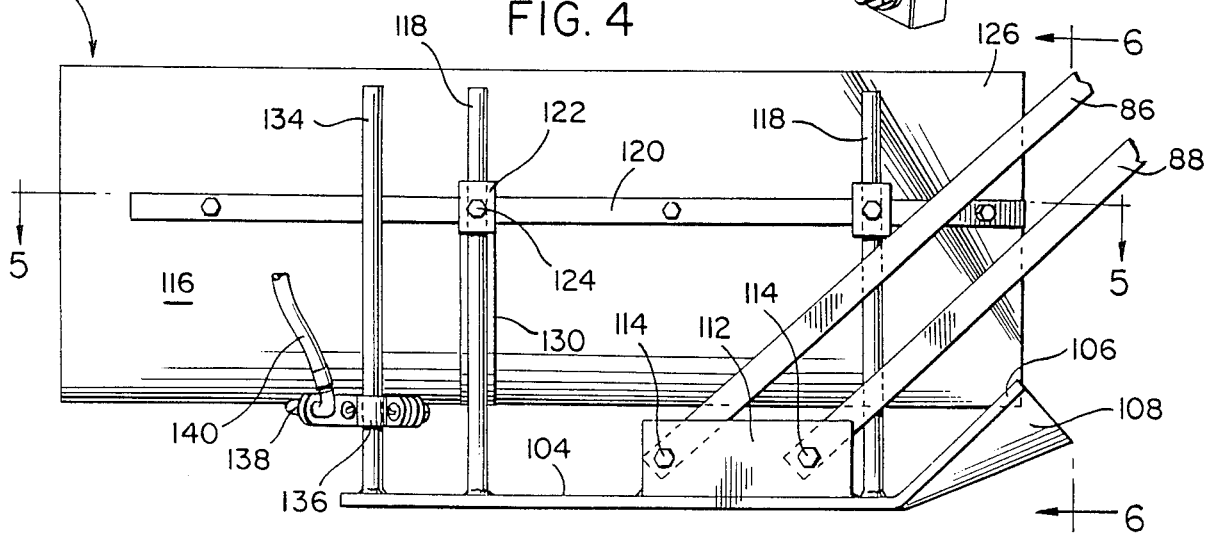
FIG. 4 is a side elevational view of the plant leaf lifter and protector of the present invention.

Referring now specifically to FIGS. 1-8 of the drawings, a tool bar assembly 10 is supported from a three point hitch of a tractor, not shown, and includes a front tool bar 12 and a rear tool bar 14 interconnected by parallel plates 17 and end members 16 with the plates being secured to the bars 12 and 14 by clamp brackets 18 and clamp rods 20 that are secured to the plate 17 by welding or the like along the top and bottom edges thereof to provide a rigid supporting frame structure. Supporting the front tool bar and frame is a plurality of depth wheels 22 of conventional construction whichare supported from vertical support members 24 each of which has an axle or spindle 26 at the lower end thereof. The upper end of each support member 24 is laterally and vertically adjustably connected to a clamp bracket 28 attached to the front tool bar 12. An upstanding bracket 30 is rigidly affixed to the front tool bar 12 and is braced by inclined braces 32 which extend to the rear tool bar 14 with the upper end of the bracket 30 including spaced plates with apertures 34 by which the top arm of a three point hitch assembly can be connected. Adjacent to but spaced on the upstanding A-frame bracket 30 is a pair of bracket assemblies 36 for accommodating the draft pins 38 for connecting the rearward ends of the lower arms of the three point hitch assembly to the tool bar assembly 10. The rear tool bar 14 includes a plurality of bracket assemblies 40 for supporting a plurality of plant leaf lifters and protectors generally designated by the numeral 42 in laterally adjusted position in relation to the tool bar 14 with the specific structure of the bracket assemblies 36 and 40 being described hereinafter and the specific structure of the plant leaf lifter and protector being described in detail hereinafter. A supporting prop 44 maybe adjustably mounted in a sleeve with a set screw as at 46 for supporting the tool bar assembly 10 when not connected to the three point hitch of a tractor. Other than the specific structural details of the bracket assemblies 36 and 40 and the specific structural details of the plant leaf lifter and protector 42, the tool bar assembly 10, the supporting prop 44 and the A-frame bracket 30 are substantially of conventional construction.

Figure 7:
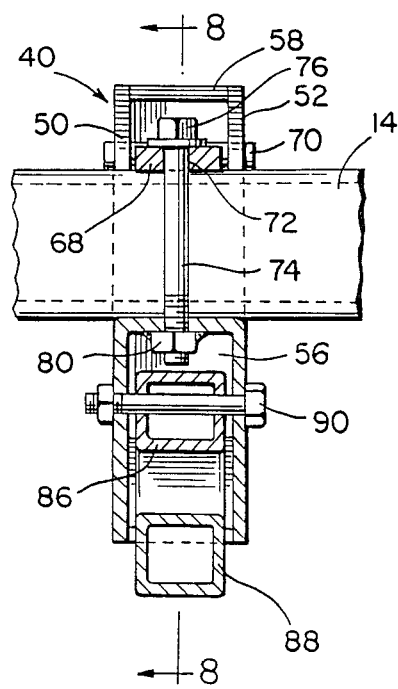
FIG. 7 is a sectional view taken along section line 7—7 illustrating the structure of the rear portion of one of the bracket assemblies.
Figure 8:
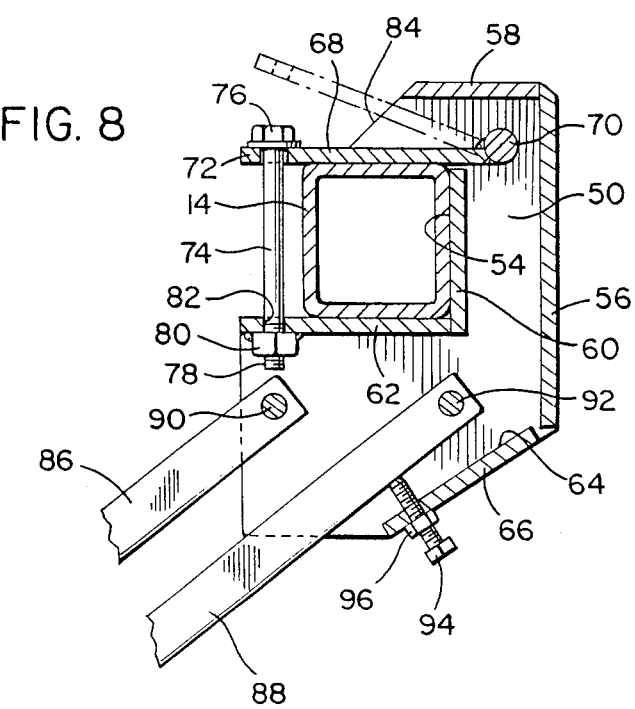
FIG. 8 is a sectional view taken along section line 8—8 on FIG. 7 illustrating further structural details of the bracket assembly and its association with the tool bar and supporting links for the plant leaf lifter and protector.

As illustrated in FIGS. 7 and 8, the unique bracket assembly 40 includes a pair of substantially flat, parallel, vertically oriented, V-shaped side plates 50 and 52, each of which includes a notch 54 formed in the rearwardly facing edge thereof with the notch 54 constructed of a size to receive the rear tool bar 14. The vertically straight forward edges of the plates 50 and 52 are rigidly interconnected by a front plate 56, the horizontally disposed top edges of the plates 50 and 52 are rigidly connected by a top plate 58 and the forward edges of the notch 54 are interconnected by a front notch plate 60 and the bottom edges of the notch 54 are interconnected by a bottom notch plate 62 with all of these components being rigidly and fixedly welded together. The bottom edge of the plates 50 and 52 includes a forward inclined corner portion 64 with the inclined portions being rigidly interconnected by an inclined bottom plate 66. An elongated clamp plate 68 extends along the top surface of the tool bar 14 and includes a rod or pin 70 welded to the inner edge thereof and the ends of the rod 70 extend through and are journalled between the side plates 50 and 52 just forwardly of the upper edge of the front notch plate 60 as illustrated in FIG. 8. The rearward free end of the clamp plate 68 is provided with an aperture 72 therethrough receiving a bolt 74 having a head 76 at its upper end and a threaded lower end 78 which is screw threaded into a nut 80 welded or otherwise fixedly secured to the rearward end portion of the bottom notch plate 62 which has an aperture 82 therein receiving the bolt 74. Thus, by removing the bolt 74 and pivoting the clamp plate 68 upwardly to the dotted line position illustrated in FIG. 8, the bracket assembly 40 may be easily mounted onto the tool bar 14 and the clamp plate 68 lowered and the bolt 74 inserted and tightened. As illustrated, the rearward edges of the side plates 50 and 52 above the top of the notch 54 are inclined away from the bolt head 76 as indicated at 84 thereby providing access to the bolt head 76 so that any type of wrench or other turning implement may be utilized to tighten or loosen the bolt 74 since no interference will be provided to access to the bolt head 76. With this construction, the bracket assembly 40 is easily and quickly mounted and adjusted and securely locked in position but yet easily released and removed when necessary. The bracket assembly 40 provides a relatively lightweight but yet rigid and strong structure capable of many variations and uses.

One of these uses of the bracket assembly 40 is to support the plant leaf lifter and protector which includes a pair of parallel links 86 and 88 which are oriented in parallel relation to each other and are inserted into the rear lower end of the bracket assembly 40 between the plates 50 and 52 with the pivot bolts or pins 90 and 92 connecting the links 86 and 88 to the plates 50 and 52. As illustrated, the inclined bottom plate 66 is provided with an adjustable stop 94 in the form of a headed screw threaded member extending through an aperture and internally threaded nut assembly 96 welded exteriorly or interiorly of the plate 66. Thus, a downward limit to the downward swinging movement of the links 86 and 88 is provided which can be adjusted so that when the tool bars are lifted such as by the three point hitch, the plant leaf lifters and protectors also will be lifted.

The bracket assembly 36 is a modified version of the bracket assembly 40 with the bracket assembly 36 including the same side plates, notch to receive the front tool bar 12 and clamp structure as employed in the bracket assembly 40 except that the side plates 50' and 52' extend forwardly from the tool bar 12 a greater extent and the forward ends of the side plates are generally oval-shaped or V-shaped and somewhat pointed as at 98 and spaced apart to define a longitudinally extending slot-like opening 100 so that the rearward ends of the lower arms or links of a three point hitch may be received between the forward ends 98 of the plates 50' and 52'. Each forward end 98 of the side plates has an opening 102 therein which receives a draft pin 38 so that the draft pin 38 can be inserted into apertures in the rearward ends of the rearwardly extending lower arms of the three point hitch on the tractor with the upper arm or link of the three point hitch being attached to and pinned to the upper end of the upwardly and forwardly extending A-frame bracket 30 by inserting a draft pin through the apertures 34 and the aperture in the rearward end of the upper arm or link of the three point hitch on the tractor in a manner well known in the art.

Figure 6:
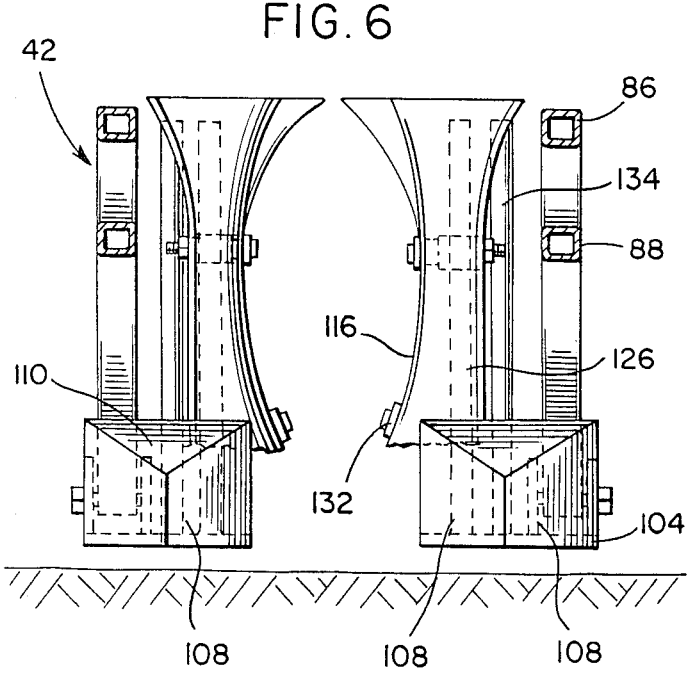
FIG. 6 is a transverse sectional view taken along section line 6—6 on FIG. 4 illustrating the front of the plant leaf lifter and protector in elevation.

The plant leaf lifter and protector 42 is supported by the parallel bars or links 86 and 88 with the bracket assembly 40, links 86 and 88 and the plant leaf lifter and protector 42 being duplicated on each side of a row of plants so that the row of plants will move between facing pairs of plant leaf lifters and protectors. Each of the plant leaf lifters and protectors 42 includes a longitudinally extending shoe or skid plate 104 of generally elongated rectangular configuration and is provided with generally planar upper and lower surfaces with the forward end of the skid or shoe 104 being upwardly inclined at 106. The forwardly facing surface of the upwardly inclined end 106 is provided with upwardly inclined and forwardly converging plates 108 defining a generally V-shaped configuration when observing the forward end thereof as illustrated in FIG. 6 with the rear edges of the plates 108 being secured to the juncture between the skid 104 and the upturned end 106 and being generally horizontal with the forward ends of the plates 108 defining a generally V-shaped configuration with the upper end being closed by a generally triangular plate 110 or, if desired, the upper end may be left open. This construction enables the shoe or skid 104 to slide along the ground surface adjacent to but spaced from the row of plants with the V-shaped forward end serving to reduce lateral forces exerted on the shoe or skid when it comes into contact with irregularities in the ground surface. Adjacent the forward upturned end 106 of the shoe 104, a pair of upstanding plates 112 are provided with the lower ends of the links 86 and 88 being received therebetween and pivotally secured thereto bypivot bolts 114 thus completing the parallelogram linkage withthe pivot bolts 90 and 92 and the links 86 and 88.

Figure 5:
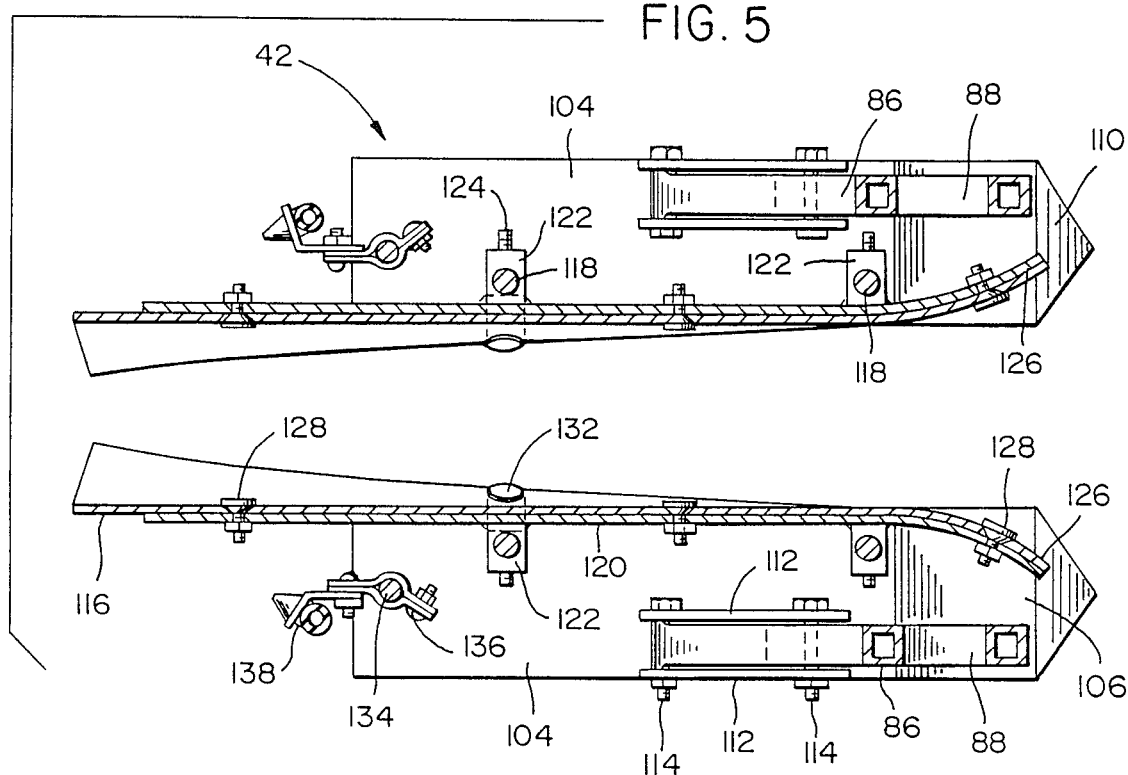
FIG. 5 is a longitudinal, plan sectional view taken substantially along section line 5—5 on FIG. 4 illustrating further structural details of the plant leaf lifter and protector of the present invention.
Figure 3:
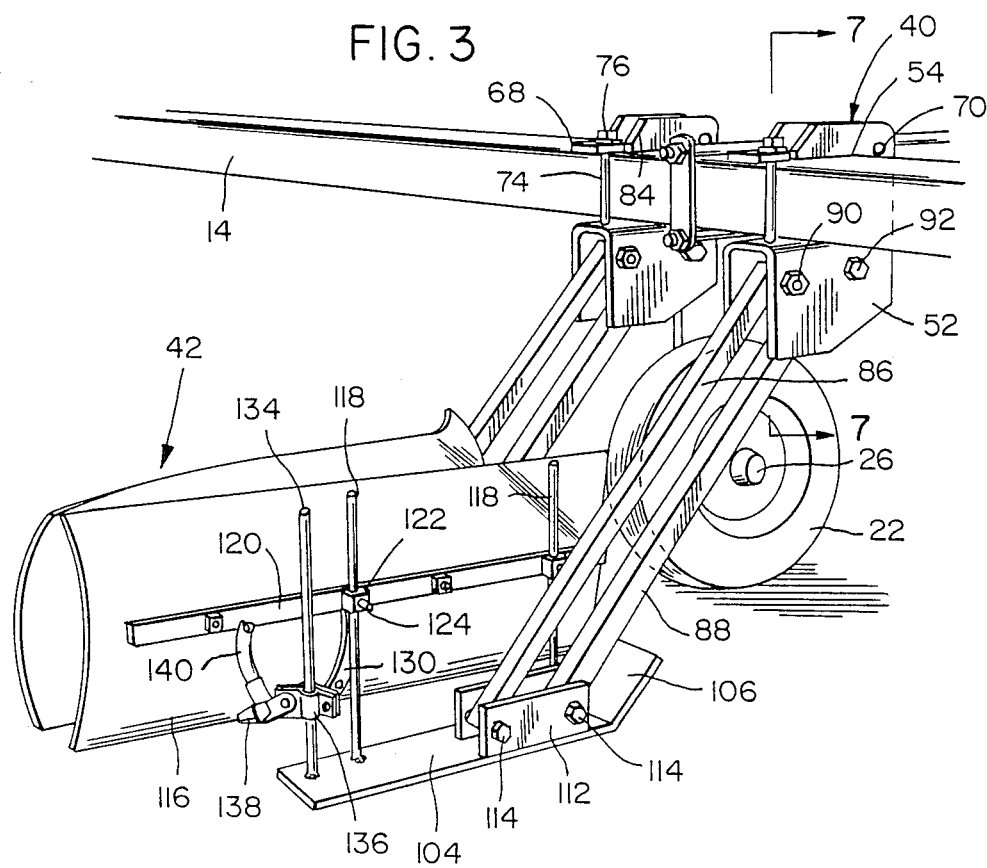
FIG. 3 is a rear perspective view of the bracket assemblies and the plant leaf lifter and protector associated therewith.

Each plant leaf lifter and protector 42 includes a shield 116 in the form of an elongated, generally rectangular panel of semi-rigid plastic material such as that used in constructing conveyor belts which is impervious to deterioration by herbicides, fertilizers or other materials that may come into contact therewith. For adjustably supporting the shield 116 from the skid 104, the skid 104 is provided with a pair of parallel, vertically extending support rods 118 rigidly affixed to the upper surface of the skid and a horizontally extending support bar or strap 120 oriented horizontally and generally perpendicular to the rods 118. The strap 120 includes a pair of brackets 122 slidable on the rods 118 with a setscrew 124 securing the support bar or strap 120 in adjusted vertical position on the rods 118. The forward end of the supporting bar or strap 120 is curved laterally outwardly at 126 and a plurality of fastening devices in the form of nuts and bolts 128 are spaced longitudinally along the support bar or strap 120 and extend through the shield 116 for securing the shield 116 generally at its longitudinal center to the support bar or strap 120 thus conforming the longitudinal center of the shield 116 with the configuration of the bar or strap 120 as illustrated in FIG. 5. At the rearmost supporting bracket 122 and generally near the front-to-rear center of the shield 116, the shield 116 is inwardly curved at the bottom by the provision of a shaping strap 130 which is rigidly affixed to the bar or strap 120 and curved gradually inwardly toward the bottom of the shield 116 and the shaping bar 130 is secured to the shield 116 by fastenng devices 132 similar to the fastening devices 128 to curve the bottom edge portion of the shield 116 inwardly into a generally arcuate curvature from top to bottom with the concave surface facing inwardly. To complete the spray rig for applying herbicides, fertilizers and the like, a supporting rod 134 is attached to the upper surface of the shoe or skid 104 adjacent the rear end thereof and slightly outwardly from the support rods 118. A bracket 136 is adjustably secured on the rod 134 and pivotally supports a spray nozzle 138 having a hose 140 extending therefrom to a supply system for liquid material that is desired to be applied to the soil adjacent the plant stems and foliage without contacting the plant stems or foliage. As illustrated, the rearward end portions of the shields 116 protect the foliage and stems of the plants which are passing between the pair of shields 116 with the forward portion of the shields 116 curving outwardly and being generally vertically disposed to guide the leaves and foliage between the shields 116 with the inwardly curved bottom edges of the shields 116 serving to lift the leaves and foliage upwardly so that the discharge from the spray nozzle 138 will not come into contact with the foliage, leaves or stems of the plant.

Figure 9:
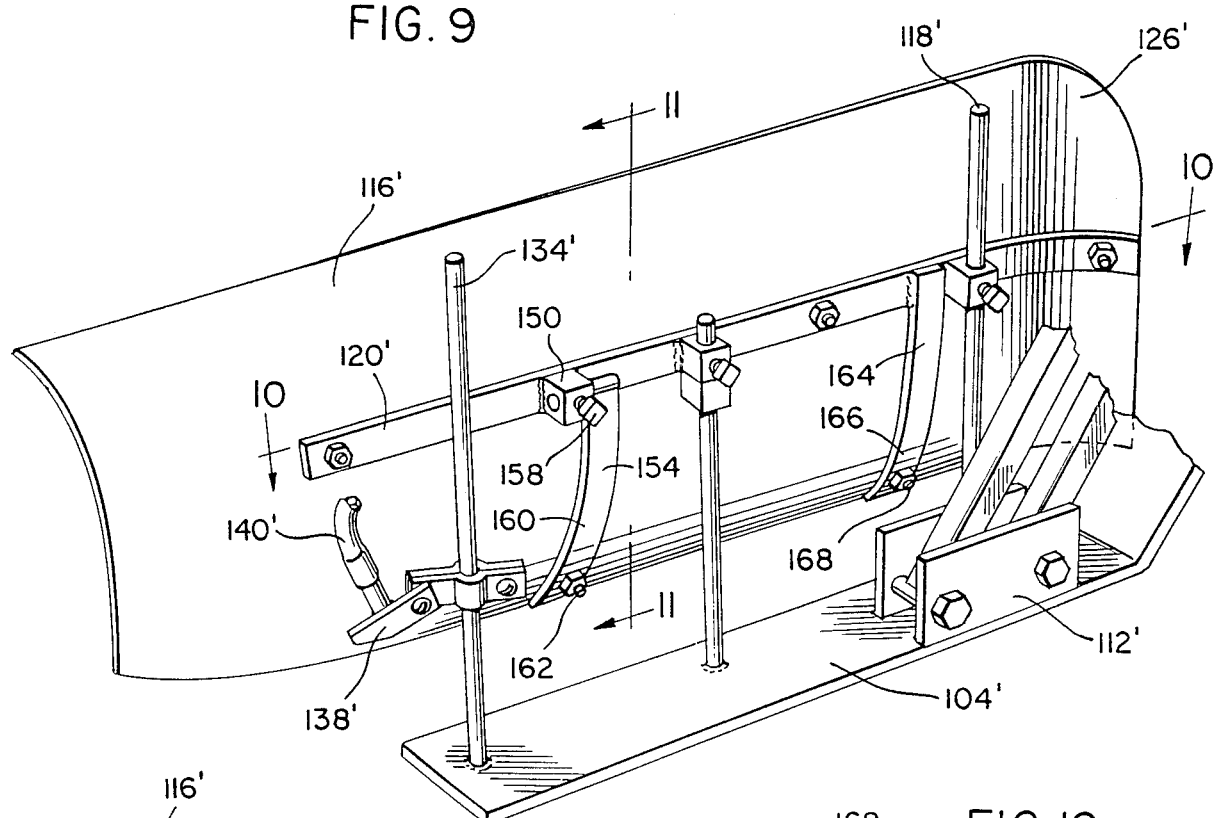
FIG. 9 is a perspective view similar to FIG. 3 but illustrating a structure for adjusting the lift characteristics of the leaf lifter.
Figure 10:
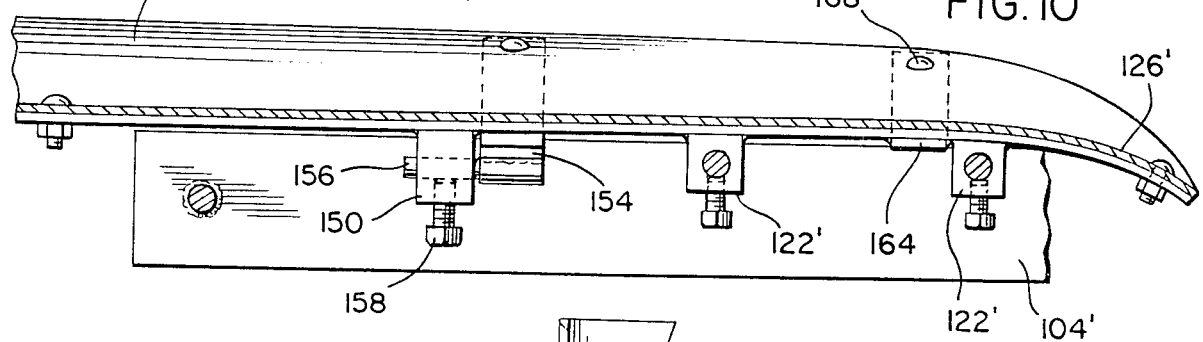
FIG. 10 is a longitudinal sectional view taken along section line 10—10 on FIG. 9.
Figure 11:
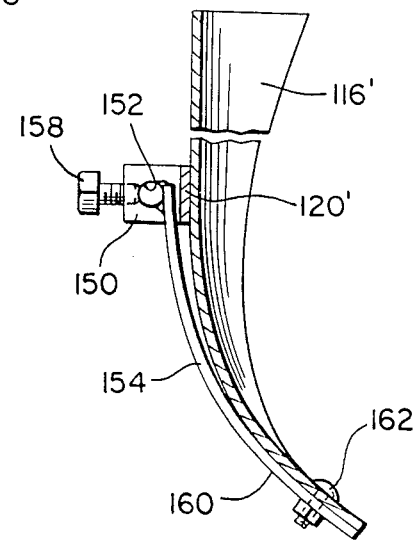
FIG. 11 is a transverse sectional view taken along section line 11—11 on FIG. 9 illustrating the association of the components of the leaf lifter.

FIGS. 9–11 illustrate another feature of this invention which enables adjustment of the degree of lift obtained by each leaf lifter and also allows variation in the width of the spray pattern when the spraying mechanism is activated. As illustrated, the plant leaf lifter and protector in FIGS. 9–11 is designated by reference numeral 42' and all components in FIGS. 9–11 which correspond with the same or similar components in FIGS. 1–8 are designated by the same reference numerals which are primed. A mounting block 150 is affixed to the exterior of strap 120' rearwardly of the rear bracket 122' by welding and includes a bore 152 extending therethrough in generally parallel relation to strap 120'. A curved shaping bar 154 having a laterally extending short rod 156 at its upper end is supported from block 150 by the rod 156 being mounted in the bore 152 for angular adjustment. A set screw 158 secures the rod 156 and shaping bar 154 in adjusted relation in order to adjust the inwardly curved lower end portion 160 of the shaping bar 154 inwardly and outwardly in relation to the strap 120'. This enables the curvature and thus the leaf lifting capability of the shield 116' to be varied. The lower end portion 160 of the shaping bar 154 is secured to the lower edge portion of shield 116' by fasteners 162.

The shaping bar 154 replaces the bar 130 in FIGS. 1–8 and is moved rearwardly in relation to support rod 118'. In order to better control the curvature of the shield 116', a forward shaping bar 164 is rigidly affixed to strap 120' rearwardly of the front support rod 118'. The bar 164 has an inwardly curved lower end portion 166 secured to the shield 116' by the use of fasteners 168. The use of the forward rigidly mounted curved shaping bar 164 and the adjustable rearward shaping bar 154 provides the operator with the capability of adjusting the leaf lifting characteristics of the shield 116'. This also enables the operator to vary the band width of the spray pattern which is applied when liquid is discharged from the spray nozzle 138'.

The various components of the bracket assemblies 36 and 40 and the plant leaf lifter and protector 42 are readily available with the specific construction of the side plates and the links 86 and 88, preferably hollow tubular members of square or rectangular configuration, and the plates 112 combined with the pivot bolts providing substantial lateral stability to the shields 116 in order to maintain them in properly spaced relation with the spacing therebetweeen being adjustable by loosening the bracket assemblies 40 and adjusting them longitudinally along the length of the tool bar 14. The bracket assemblies may be utilized for supporting various other agricultural implements including various types of cultivators, tillage tools and the like.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In combination with a tool bar for support rearwardly of a tractor having a three point hitch, said tool bar including an A-frame bracket and a pair of horizontally spaced bracket assemblies disposed on the tool bar for mounting engagement with the lower arms and upper arm of a three point hitch, bracket assemblies mounted on the tool bar in pairs with each pair of bracket assemblies supporting a plant leaf lifter and protector extending downwardly and rearwardly therefrom for movement along a path adjacent opposite surfaces of a row of plants and including a discharge nozzle for discharging liquid material onto the ground surface adjacent the plants with the plant leaf lifter and protector protecting the plants from direct contact with the discharged material, each of the bracket assemblies comprising a pair of generally parallel side plates with each of the side plates including a rearwardly opening notch of a configuration to receive the tool bar, rigid means interconnecting the side plates with the edges of the notches in the side plates engaging a substantial portion of the periphery of the tool bar, a pivotal clamp plate mounted between the side plates at the upper end of the notch and extending rearwardly into overlying relation to the tool bar, a clamp bolt extending through the clamp plate and a threaded fitting rigid with the bottom of the notch rearwardly of the tool bar whereby the bracket assemblies may be adjustably and tightly clamped to the tool bar.

2. The combination as defined in claim 1 wherein said plant leaf lifter and protector includes a longitudinally extending shield in the form of a semi-rigid panel of non-metallic material having an outwardly flared forward edge and an inwardly facing concave surface toward the rear, a ground engaging skid plate, parallel links pivotally interconnecting the skid plate and bracket assembly to enable the skid plate to move along the ground surface and means on the skid plate adjustably supporting the shield to orient the shield in desired relation to a row of plants, said discharge nozzle being supported from the skid plate outwardly of the shield whereby the shield will preclude liquid material discharged from the nozzle coming into direct contact with the plant stems or leaves.

3. The combination as defined in claim 2 wherein said means supporting the shield includes a pair of upright rods rigidly affixed to said skid plate, vertically adjustable brackets on said rods, an elongated support bar attached to said brackets and extending longitudinally along the center line of the shields from front to rear, fastening means securing the support bar to the shield, the forward end of the support bar curving laterally outwardly thereby curving the forward end of the shield outwardly, a depending inwardly curved shaping strap rigid with the support bar adjacent the center thereof and curving inwardly and downwardly to shape the central and rear portion of the shield with the lower edge portion curved inwardly to lift plant leaves upwardly along the inner surface of the shields, said shields being constructed of semi-rigid plastic material capable of sustaining its shape but being shaped by its connection with the support bar and shaping strap.

4. The combination as defined in claim 3 wherein said skid plate includes an upwardly extending support rod adjacent the rear edge thereof, said discharge nozzle being vertically adjustably supported on said support rod and adapted to discharge material downwardly toward the lower outer edge surface portion of the shield rearwardly of the skid plate with a hose connected with the discharge nozzle for supplying liquid material to be discharged therefrom.

5. The combination as defined in claim 4 wherein said skid plate includes an upturned forward end portion provided with forwardly converging plates defining a forwardly facing V-shaped structure for engagement with the ground surface to stabilize movement of the skid plate along the ground surface.

6. The combination as defined in claim 5 wherein said skid plate includes a pair of upstanding plates rigidly affixed to the upper surface thereof in laterally spaced relation adjacent the upturned forward end thereof, said pair of links being in the form of hollow tubular members of polygonal configuration for reception between the plates on the skid plate with pivot bolts securing the lower ends of the links to the skid plate with the side plates on the bracket assembly and the plates on the skid plate closely receiving the links along the side surfaces thereof for providing lateral stability to the skid plate.

7. The combination as defined in claim 6 wherein said bracket assembly includes an adjustable stop member engageable with the lower surface of the lower link supporting the skid shoe for limiting the downward swinging movement of the plant leaf lifter and protector in relation to the tool bar.

8. The combination as defined in claim 7 wherein said side plates forming the bracket assembly include spacer plates rigidly connected between the side plates and defining the rearwardly opening notch with the rearwardly opening notch being of generally channel-shaped configuration.

9. The combination as defined in claim 8 wherein said bracket assemblies associated with the A-frame bracket include a notch receiving the tool bar, a clamp plate and clamp bolt corresponding with the bracket assembly supporting the plant leaf lifter and protector, said bracket assemblies associated with the A-frame bracket extending forwardly of the tool bar and including spaced side plates accommodating the rearward ends of the lower lift arms of the three point hitch and draft pins connecting the lower arms to the bracket assemblies.

10. The combination as defined in claim 9 wherein said tool bar includes a generally rigid frame with forward and rearward tool bar members rigidly interconnected, depth wheels adjustably mounted on the forward tool bar member and adjustable propmembers mounted at the ends of the tool bar for supporting the tool bar when disconnected from the three point hitch of a tractor.

11. The combination as defined in claim 3 together with a second depending inwardly curved shaping strap disposed rearwardly of the shaping strap rigid with the support bar, and means connecting the second shaping strap to the support bar to enable adjustment of the second shaping strap to adjust the shield for varying the leaf lifting characteristics of the shield.

12. The combination as defined in claim 11 wherein said connecting means includes a support block rigidly affixed to the support bar, a generally horizontal bore in said block, said bore having a longitudinal axis generally parallel to the support bar, said second shaping strap having an inwardly curved lower end, means securing the lower end of the second shaping strap to the shield, said second shaping strap having a laterally extending support rod at its upper end, said support being rotatably received in said bore to enable the second shaping strap to be swung inwardly and outwardly in relation to the support bar, and means on said support block to lock said support rod in angularly adjusted position in said bore.

13. A plant leaf lifter and protector comprising a longitudinally extending shield in the form of a semi-rigid panel of non-metallic material having an outwardly flared forward edge and an inwardly facing concave surface toward the rear, a ground engaging skid plate, means supporting the skid plate to enable the skid plate to move along the ground surface and means on the skid plate adjustably supporting the shield to orient the shield in desired relation to a row of plants, and a discharge nozzle supported outwardly of the shield whereby the shield will preclude liquid material discharged from the nozzle coming into direct contact with the plant stems or leaves, said means supporting the shield including a pair of upright rods rigidly affixed to said skid plate, vertically adjustable brackets on said rods, an elongated support bar attached to said brackets and extending longitudinally along the central portion of the shield from front to rear, fastening means securing the support bar to the shield, the forward end of the support bar curving laterally outwardly thereby curving the forward end of the shield outwardly, a depending inwardly curved shaping strap rigid with the support bar between the ends thereof and curving inwardly and downwardly to shape the central and rear portion of the shield with the lower edge portion curved inwardly to lift plant leaves upwardly along the inner surface of the shield, said shield being constructed of semi-rigid plastic material capable of sustaining its shape but being shaped by its connection with the support bar and shaping strap.

14. The plant leaf lifter and protector as defined in claim 13 together with a second depending inwardly curved shaping strap disposed rearwardly of the shaping strap rigid with the support bar, and means connecting the second shaping strap to the support bar to enable adjustment of the second shaping strap to adjust the shield for varying the leaf lifting characteristics of the shield.

15. The plant leaf lifter and protector of claim 14 wherein said connecting means includes a support block rigidly affixed to the support bar, a generally horizontal bore in said block, said bore having a longitudinal axis generally parallel to the support bar, said second shaping strap having an inwardly curved lower end, means securing the lower end of the second shaping strap to the shield, said second shaping strap having a laterally extending support rod at its upper end, said support being rotatably received in said bore to enable the second shaping strap to be swung inwardly and outwardly in relation to the support bar, and means on said support block to lock said support rod in angularly adjusted position in said bore.

* * * * *